United States Patent
Coppoolse

(10) Patent No.: US 10,329,072 B2
(45) Date of Patent: Jun. 25, 2019

(54) METHOD FOR IMPROVING THE STORABILITY OF SEEDS

(71) Applicant: RIJK ZWAAN ZAADTEELT EN ZAADHANDEL B.V., De Lier (NL)

(72) Inventor: Eric Roland Coppoolse, De Lier (NL)

(73) Assignee: RIJK ZWAAN ZAADTEELT EN ZAADHANDEL B.V., De Lier (NL)

( * ) Notice: Subject to any disclaimer, the term of this patent is extended or adjusted under 35 U.S.C. 154(b) by 0 days.

(21) Appl. No.: 15/138,257

(22) Filed: Apr. 26, 2016

(65) Prior Publication Data

US 2016/0236848 A1    Aug. 18, 2016

Related U.S. Application Data

(63) Continuation-in-part of application No. PCT/EP2014/074081, filed on Nov. 7, 2014.

(30) Foreign Application Priority Data

Nov. 8, 2013  (NL) .................................. 2011768

(51) Int. Cl.
*B65D 81/26* (2006.01)
*A01C 1/00* (2006.01)
(Continued)

(52) U.S. Cl.
CPC .............. *B65D 81/266* (2013.01); *A01C 1/00* (2013.01); *B65D 85/50* (2013.01); *A23B 9/26* (2013.01); *A23L 3/3436* (2013.01)

(58) Field of Classification Search
CPC .. A01C 1/00; A01C 1/02; A01C 1/025; A01C 1/04; A01C 1/042; A01C 1/044;
(Continued)

(56) References Cited

U.S. PATENT DOCUMENTS 2,758,932 A    8/1956 Scott
3,369,859 A *  2/1968 Cornelius .............. B65D 81/26
                                            206/213.1
(Continued)

FOREIGN PATENT DOCUMENTS

EP    0 267 443    5/1988
EP    0 810 163    12/1997
(Continued)

OTHER PUBLICATIONS

International Search Report and Written Opinion of the International Searching Authority dated Dec. 18, 2014, which issued during prosecution of International Application No. PCT/EP2014/074081.

*Primary Examiner* — Bryon P Gehman
(74) *Attorney, Agent, or Firm* — Duane Morris LLP; Thomas J. Kowalski; Deborah L. Lu

(57) ABSTRACT

The invention relates to a method for improving the storability of seeds, comprising storing the seeds in the presence of an oxygen absorber. Preferably, the seeds are stored in a closed container. In a first embodiment, the oxygen absorber does not remove moisture from inside the container. In another embodiment, the oxygen absorber does remove moisture from inside the container. The seeds can be stored at a temperature between freezer temperature and the temperature at which the seeds lose their viability. Upon storing seeds according to the invention the storage temperature can be much higher.

7 Claims, 10 Drawing Sheets

(51) Int. Cl.
*B65D 85/50* (2006.01)
*A23L 3/3436* (2006.01)
*A23B 9/26* (2006.01)

(58) Field of Classification Search
CPC . A01C 1/046; A23B 9/26; A23L 3/343; A23L 3/3436; B65D 81/26; B65D 81/266; B65D 85/50
See application file for complete search history.

(56) References Cited

U.S. PATENT DOCUMENTS

| | | | |
|---|---|---|---|
| 3,703,051 A * | 11/1972 | Weinberger | A01C 1/02 47/58.1 R |
| 4,272,276 A * | 6/1981 | Szejtli | A01N 43/16 47/57.6 |
| 4,981,007 A * | 1/1991 | Shima | B65B 31/006 53/403 |
| 8,375,628 B2 * | 2/2013 | Petersen | G01N 33/0098 435/287.1 |
| 8,763,305 B1 * | 7/2014 | Petersen | G01N 33/0098 435/287.1 |
| 9,521,802 B1 * | 12/2016 | Petersen | A01C 1/025 |
| 2003/0082321 A1 | 5/2003 | Kennedy et al. | |
| 2012/0131849 A1 * | 5/2012 | Asada | A01C 1/02 47/58.1 SE |

FOREIGN PATENT DOCUMENTS

| | | |
|---|---|---|
| EP | 2 606 959 | 6/2013 |
| JP | 2003-088344 | 3/2003 |

* cited by examiner

METHOD FOR IMPROVING THE STORABILITY OF SEEDS

RELATED APPLICATIONS AND INCORPORATION BY REFERENCE

This application is a continuation-in-part application of international patent application Serial No. PCT/EP2014/074081 filed 7 Nov. 2014, which published as PCT Publication No. WO 2015/067774 on 14 May 2015, which claims benefit of Dutch patent application Serial No. 2011768 filed 8 Nov. 2013.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to a method for improving the storability of seeds. The present invention also relates to seed packaging.

BACKGROUND

Plants seeds are very sensitive to the surrounding environment, especially when they are stored for a prolonged period of time. The presence of moisture and oxygen at high temperatures is e.g. very detrimental to their survival and storability, and the presence of pathogenic organisms in a seed batch may further jeopardize the seeds' storability.

When seeds have been pre-treated before packaging, for example by means of priming, they often become even more sensitive to environmental factors and their storability decreases further. In commercial seed business it would be very desirable if seeds can be stored for a prolonged period of time without losing their viability and their ability to germinate (preferably quickly and simultaneously) to give rise to healthy and vigorous plants.

If seeds can be stored for a longer period of time, they can e.g. be kept until the next growing season if they had not been sold in time for sowing during the current season. If such seeds only have a limited storability, they would necessarily have to be thrown away, because their quality would no longer meet the high commercial standards at the time of the next growing season. This could represent a significant economic loss for the company or for the intermediary or end-user who had bought the seeds but had not sold or sown them in time.

Traditionally, seeds are preferably stored in cool and dry environments which requires investment in cooling infrastructure.

In the research leading to this invention, it was surprisingly found that oxygen absorbers may be used to increase the storability and long-term viability of living objects, in particular of living plant seeds, thereby largely abolishing the effects of temperature on seed storability. It was also found that oxygen absorbers that do not change the relative humidity of the atmosphere surrounding the stored seeds give better results.

Oxygen absorbers have previously been used in several environments and for various purposes. When attempting to preserve and store inanimate objects such as wood or metal, or food products, the presence of oxygen is usually undesired, because it allows the survival of aerobic microorganisms (such as bacteria and fungi), worms and insects which may damage, eat or otherwise spoil the stored objects, and it allows the corrosion of metal objects, especially if the storage container has a high humidity. In such cases oxygen absorbers have been used to increase the storability of inanimate objects, by depleting the air inside the container of oxygen and moisture. Examples are their use for safely storing electronic equipment (which needs to be protected against oxygen-dependent corrosion), for preserving, transporting and storing archaeological artifacts made of metal, wood or bone (which may rapidly decay upon exposure to oxygen), for conserving works of art such as paintings or sculptures, or in the food industry. A common denominator in these described uses of oxygen absorbers is that the objects to be preserved are lifeless, easily destructible and often valuable.

In these previously described uses it is never an issue to keep the objects alive and/or to prolong their survival and viability, because they are lifeless or dead. Indeed, it is highly surprising that one can better store living objects and enhance their longevity by storage in an environment that is depleted of oxygen, while oxygen is essential for the survival of most higher organisms, including plants.

Atmospheric air consists of about 21 percent of oxygen ($O_2$), about 78 percent of nitrogen ($N_2$), and for the remaining fraction of other gases. Whereas oxygen is essential for the survival of aerobic organisms, its presence may sometimes be undesired. For example, the chemical reaction of oxygen with abiotic or biotic factors may lead to the generation of highly reactive molecules (such as reactive oxygen species, free radicals) that may cause damage to biological structures and molecules. In order to avoid such damage oxygen is usually flushed out by means of nitrogen or carbon dioxide. It was never contemplated before to absorb the oxygen.

In addition to increasing the storability and long-term viability of plant seeds directly, the research leading to this invention revealed that the use of oxygen absorbers during seed storage may also contribute to this same purpose by killing pathogenic or opportunistic organisms that may feed on the seeds or otherwise spoil them for further commercial use, and also by scavenging volatile compounds that are produced by some plant seeds. Some of these volatile compounds have allelopathic effects on other seeds (of the same or another plant species) when these are stored in vicinity of each other. An example of an allelopathic effect is inhibition of germination, which is highly undesired in a commercial context. During storage in confined areas (closed containers, rooms, refrigerators) such volatile compounds may accumulate to concentrations that are not commonly found under natural conditions, and this may have very strong effects on the germination rate of stored seeds.

The inventor's experiments showed that, for optimal commercial storage of plant seeds, the use of oxygen absorbers inside a seed storage container (such as a bag, a box, a cylinder, or any other type of packaging container, regardless of the material it is made of) has a very positive effect on the storability and long-term viability of the seeds, which leads to direct commercial advantages for the seed producer and for his customers.

Plant seeds are sold commercially to plant growers with the purpose of being sown to give rise to a healthy, well-performing population of crops that will yield as much harvestable material as possible. The harvestable material may e.g. include leaves, fruits, seeds, roots, tubers, flowers and/or stems.

Commercial plant seeds are often pre-treated to increase their performance. A common treatment is e.g. seed priming, which enables the seeds in a seed lot to germinate faster and more homogenously, by overcoming seed dormancy and by physiologically preparing the seeds for germination. A plant grower greatly benefits from a population of plantlets that germinate simultaneously, and that will proceed through their life cycle in a concerted manner. Also, plant seeds are often pilled and/or coated, which enables the addition of specific compounds to the seeds (such as germination-stimulating agents, or protective chemical agents that antagonize or discourage the growth of and colonization by undesired microorganisms or other organisms that could damage the seed and/or the germinating seedling). Furthermore, pilling and/or coating gives the seeds a uniform shape and size, which is advantageous when seeds are sown in a high-throughput manner, e.g. by means of an automated sowing machine.

A common disadvantage of priming and/or pilling methods, however, is that they often decrease the storability of seeds. When a seed-producing company produces commercial seed lots and proceeds to the stage of priming and/or pilling, it needs to sell the processed seeds within a certain time frame, in order for the seeds to still fulfill all required quality criteria at the time of sale, such as a very high germination rate and a very high percentage of usable transplants among the resulting plantlets. This time frame is highly dependent on the crop species, and often differences in storability are also observed between different varieties of a single crop. If the seeds cannot be sold in time they lose their commercial value, and this may represent a considerable economic loss for the seed-producing company. In the research leading to this invention it was observed that the use of oxygen absorbers significantly prolongs the storability of primed and/or pilled seeds.

The storage efficiency of living plant seeds is highly dependent on the storage environment, and it was observed that especially the surrounding temperature plays an important role herein. Seeds are often stored in a refrigerator (at about 4° C.) or in a freezer (at about −20° C.), because this generally improves the storability and the long-term viability maintenance of the seeds, but this approach requires an investment in cooling equipment, it incurs electricity costs, and it limits the available storage space to the space that can be cooled down to the desired temperature. Storing living seeds at room temperature (e.g. about 15° C. to about 25° C. in moderate climates, or about 25° C. to about 40° C. in warmer climates) is by far the cheapest and easiest option, but this may often be detrimental for the seed quality.

In the research leading to this invention it was found that especially at higher temperatures the positive effect of oxygen absorbers on the storability of living seeds is very pronounced. This makes the use of oxygen absorbers inside seed packaging very attractive, because it allows the storage of packages containing living plant seeds at ambient room temperature for a prolonged period of time without a significant loss of seed viability, even in warm environments. For commercial storage locations of plant seeds (such as shops or warehouses) this invention thus largely obviates the investment in cooling equipment for the purpose of storing seeds, such as refrigerators or freezers.

Especially in warm climates this is an enormous benefit, as seed packages to which at least one oxygen absorber has been added may be stored at room temperature, even if the ambient temperature is e.g. about 30° C. Without the inclusion of oxygen absorbers inside the storage container the quality of the stored seeds would rapidly decrease over time, especially if the seeds had been primed and/or pilled and/or coated, as is shown in the Examples. The use of oxygen absorbers as outlined in this application ensures the prolonged storability and maintenance of viability of living seeds, even at higher ambient temperatures.

The use of oxygen absorbers in the method of the invention thus has two related effects. First, they maintain the viability of living seeds during storage allowing the seeds to be kept at higher temperatures. In addition, the overall storability of pre-treated seeds, in particular of pilled and primed seeds, is prolonged.

Different types of oxygen absorbers that are commercially available on the market are e.g. the following: RP (manufactured by Mitsubishi Gas Chemical Company), AGELESS (manufactured by Mitsubishi Gas Chemical Company), PharmaKeep (manufactured by Mitsubishi Gas Chemical Company), StabilOx (manufactured by Multisorb Technologies), WELL PACK (manufactured by TAISEI Co.), Ever Fresh (manufactured by Torishige Sangyo Co.), Oxy-Eater (manufactured by Ueno Fine Chemicals Industry), KEEPIT (manufactured by Dorency Co.), KEPLON (manufactured by Keplon Co.), SANSO-CUT (manufactured by Iris fineproducts Co.), SANSORESU (manufactured by Hakuyo), Sequl (manufactured by Nisso Jushi Co.), TAMOTSU (manufactured by OhE Chemicals), VITALON (manufactured by Tokiwa Sangyo), Modulan (manufactured by Nippon Kayaku Food Techno Co.), Wonder Keep (manufactured by Powder Tech), and Keep Fresh Type C (manufactured by Toppan Printing Co.).

It was found according to the invention that the type of oxygen absorbers that binds oxygen without affecting the humidity of its environment is most suitable. This type is very useful for storing living seeds that are sensitive to changes in moisture content during storage.

Other types of oxygen absorbers also exist but these are not or less suitable for use in the invention.

One type needs to absorb moisture from the environment to be able to absorb oxygen. This type is only functional in relatively wet environments, and therefore unsuitable for storing living seeds.

A second type already contains moisture and can immediately absorb oxygen from the environment, without a need to absorb moisture from the environment. A feature of this second type is that it may release moisture into the environment, especially when this is a dry environment, which makes it unsuitable for living seed storage.

A third type binds both oxygen and moisture, so it requires no humidity for its function and it contains a desiccant to absorb moisture from its environment. The third type is suitable for use with living plant seeds that are drought-resistant. These three types thus alter the relative humidity of their environment.

Two examples produced by the Mitsubishi Gas Chemical Company are RP-A® and RP-K®. Both these oxygen absorbers are based on silica, and they may both be used in the method of the present invention, as is described in the Examples. However, an important difference between RP-A® and RP-K® lies in the ability of RP-K® to leave the air humidity unchanged (type 4, see above) while depleting it of oxygen, whereas RP-A® not only removes oxygen from the surrounding atmosphere, but also moisture (type 3, see above). According to the manufacturer RP-A® decreases the oxygen content inside a container to less than 0.1% within a day, while also reducing the relative humidity inside a container to less than 10% within an hour; according to the manufacturer RP-K® decreases the oxygen content inside a container to less than 0.1% within two days, while not affecting moisture content. For plant seeds that are tolerant to desiccation both types of oxygen absorbers are equally good, as shown in the Examples, but it was observed that for plant seeds that are sensitive to extreme drying the use of RP-K® is preferred. Both types work well at a broad temperature range (e.g. at −20° C. and at 30° C.), and especially at temperatures above 0° C. the effect on seed storability is very significant and pronounced.

The composition of RP-A® is as follows: mordenite, 10 to 50% $Na_8[(AlO_2)_8(SiO_2)_{40}] \times 24$ $H_2O$, 10 to 45% calcium oxide, 5 to 10% unsaturated organic compounds, 10 to 30% polyethylene, 5 to 15% activated carbon. According to the manufacturer, RP-A® is mainly intended for use with metal artifacts.

The composition of RP-K® is as follows: 10 to 40% diatomaceous earth, 1 to 20% calcium hydroxide, 10 to 25% unsaturated organic compounds, 15 to 35% polyethylene, 10 to 35% inorganic absorbent. According to the manufacturer, RP-K® is mainly intended for use with organic artifacts that require a special amount of moisture. However, its use with living material that is intended to be kept alive has never been proposed, suggested or tested.

Citation or identification of any document in this application is not an admission that such document is available as prior art to the present invention.

SUMMARY OF THE INVENTION

The method of the present invention can be applied on the living seeds of a great number of different plant species, including but not limited to tobacco, poplar, maize, wheat, barley, rice, sorghum, sugar beet, oilseed rape, ryegrass, sunflower, soybean, tomato, cucumber, gherkin, corn salad, rocket, spinach, pepper, petunia, eggplant, melon, watermelon, carrot, radish, lettuce, vegetable *Brassica* species (cabbage, cauliflower, broccoli, kohlrabi, Brussels sprouts), leek, bean, pea, endive, chicory, onion, strawberry, fennel, table beet, celery, celeriac, asparagus, sunflower, petunia, rose, *Chrysanthemum*, and any other ornamental crop, vegetable crop, fruit crop, field crop, horticultural crop.

The present invention relates to a method for increasing the storability of seeds, which may comprise storing the seeds in the presence of an oxygen absorber. In the context of this invention the plant seeds are not being stored with the intention of eating them directly, but with the intention of (at some time in the future) planting them, germinating them or otherwise creating a living plant from them. Obviously, the present invention thus relates to living seeds, because one would never contemplate to plant or germinate dead seeds with the expectation of creating a living plant from them.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

When either RP-A® or RP-K® was present in the bag, no oxygen, nor carbon dioxide could be detected.

Figure 2:
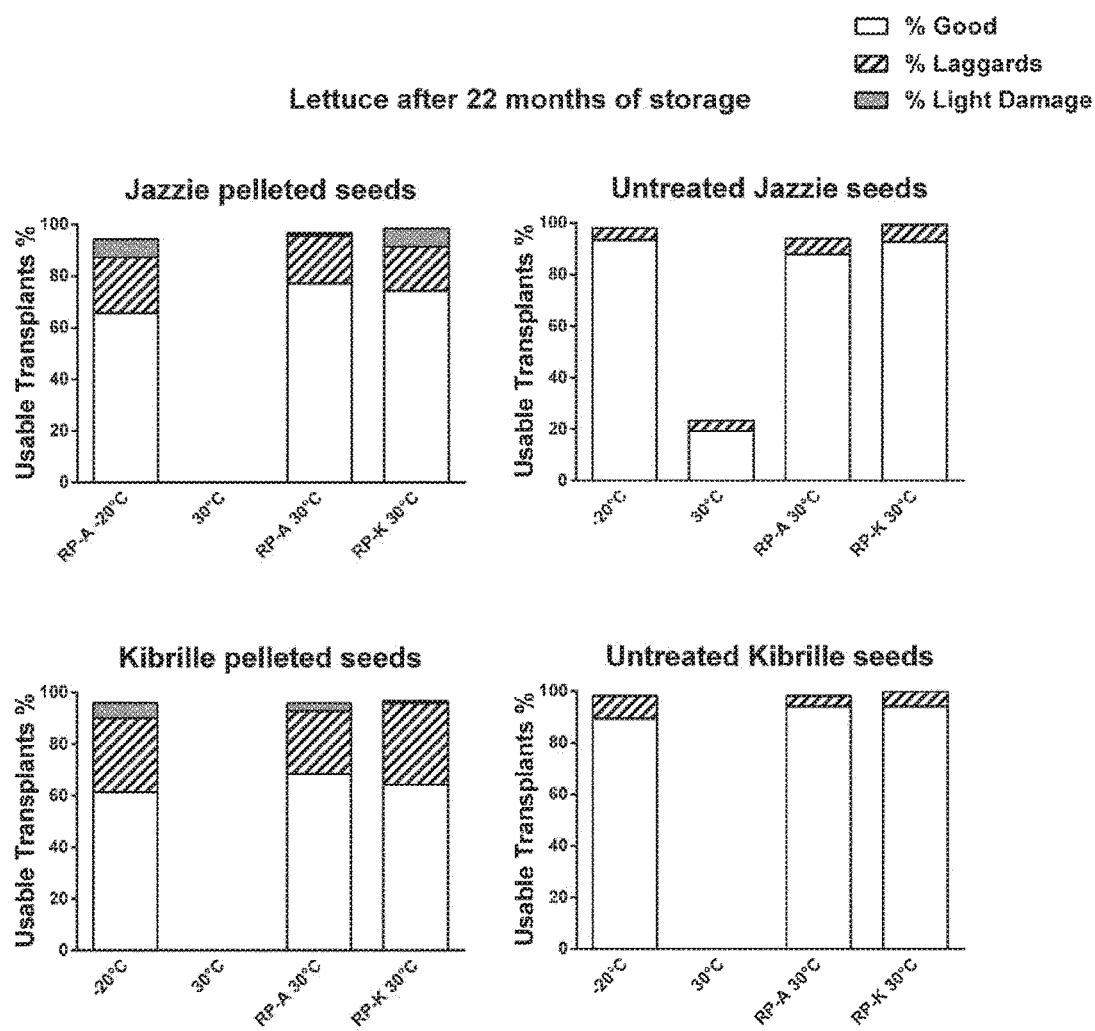

FIG. 2: Percentages of usable transplants (sub-classified as "good" seedlings, mild "laggards" (seeds that germinated with some delay) and plantlets with "light damage") resulting from batches of untreated seeds and primed and pelleted seeds (pills) of the lettuce cultivars "Jazzie" and "Kibrille", were determined after storage for 22 months at −20° C. and 30° C., with and without RP-A® or RP-K®. Both RP-A® and RP-K® offer the same level of protection to lettuce seeds and pills at 30° C. as the freezer does at −20° C.

Figure 3:
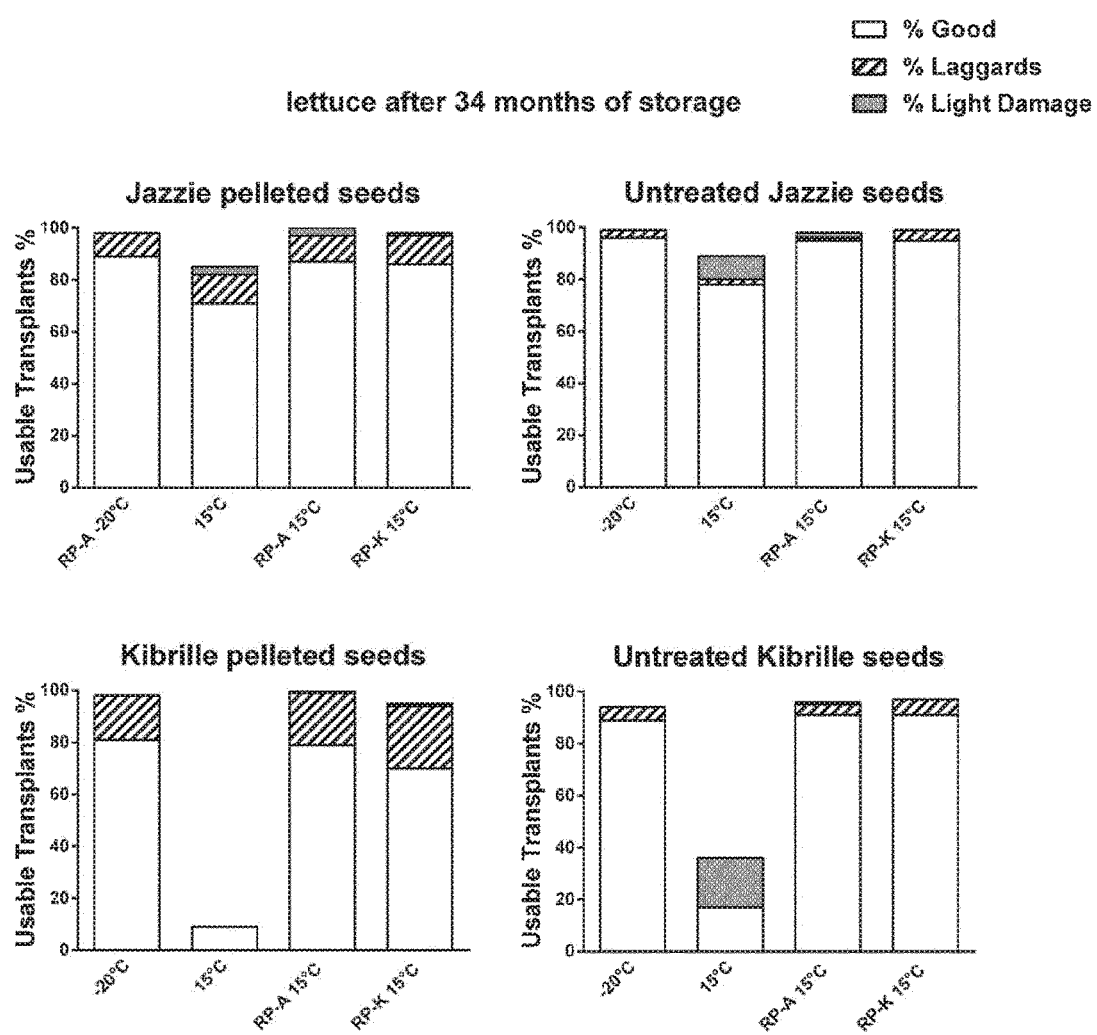

FIG. 3: Percentages of usable transplants (sub-classified as "good" seedlings, mild "laggards" and plantlets with "light damage") resulting from batches of untreated seeds and primed and pelleted seeds (pills) of the lettuce cultivars "Jazzie" and "Kibrille", were determined after storage for 34 months at −20° C. and 15° C., with and without RP-A® or RP-K®. Both RP-A® and RP-K® offer a similar level of protection to lettuce seeds and pills at 15° C. as the freezer does at −20° C.

Figure 4:
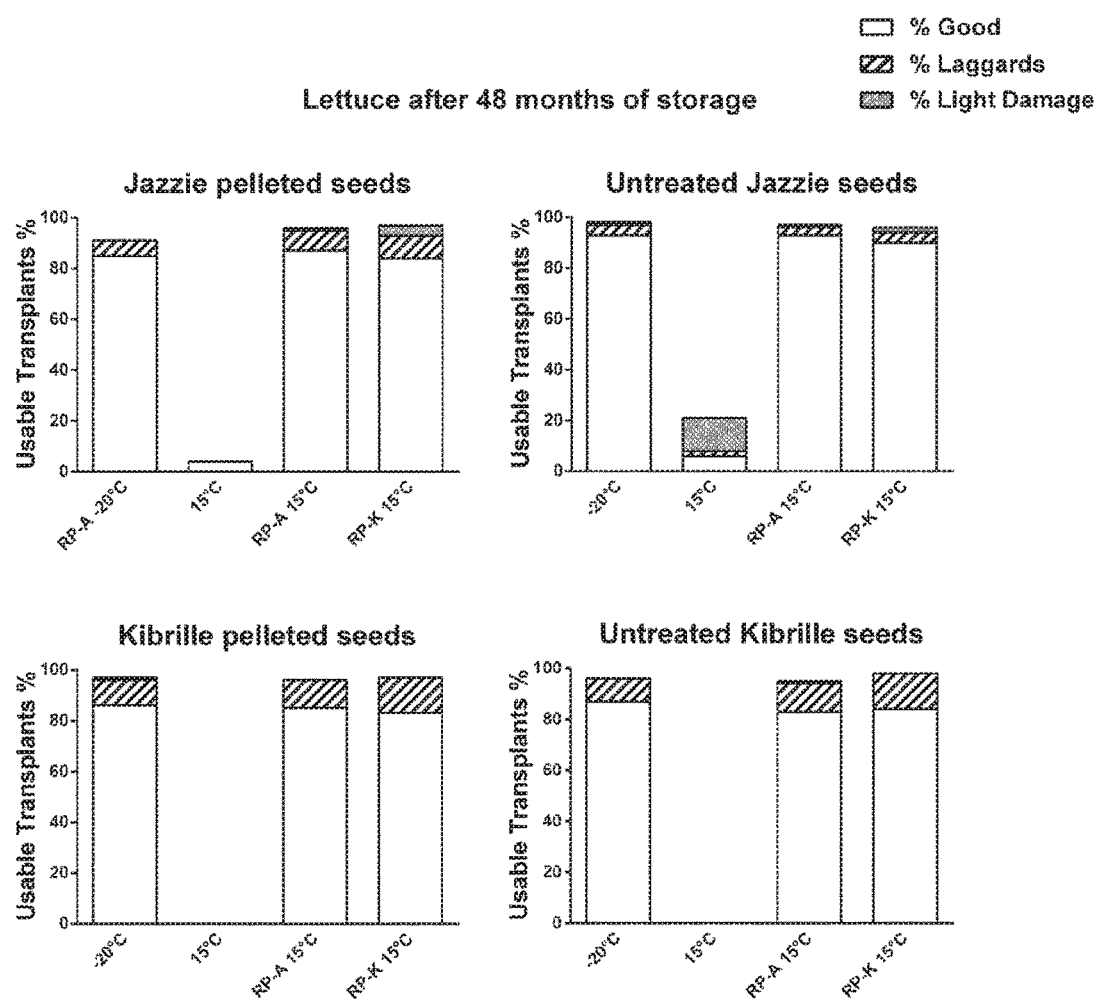

FIG. 4: Percentages of usable transplants (sub-classified as "good" seedlings, mild "laggards" and plantlets with "light damage") resulting from batches of untreated seeds and primed and pelleted seeds (pills) of the lettuce cultivars "Jazzie" and "Kibrille", were determined after storage for 48 months at −20° C. and 15° C., with and without RP-A® or RP-K®. Both RP-A® and RP-K® offer a similar level of protection to lettuce seeds and pills at 15° C. as the freezer does at −20° C.

Figure 5:
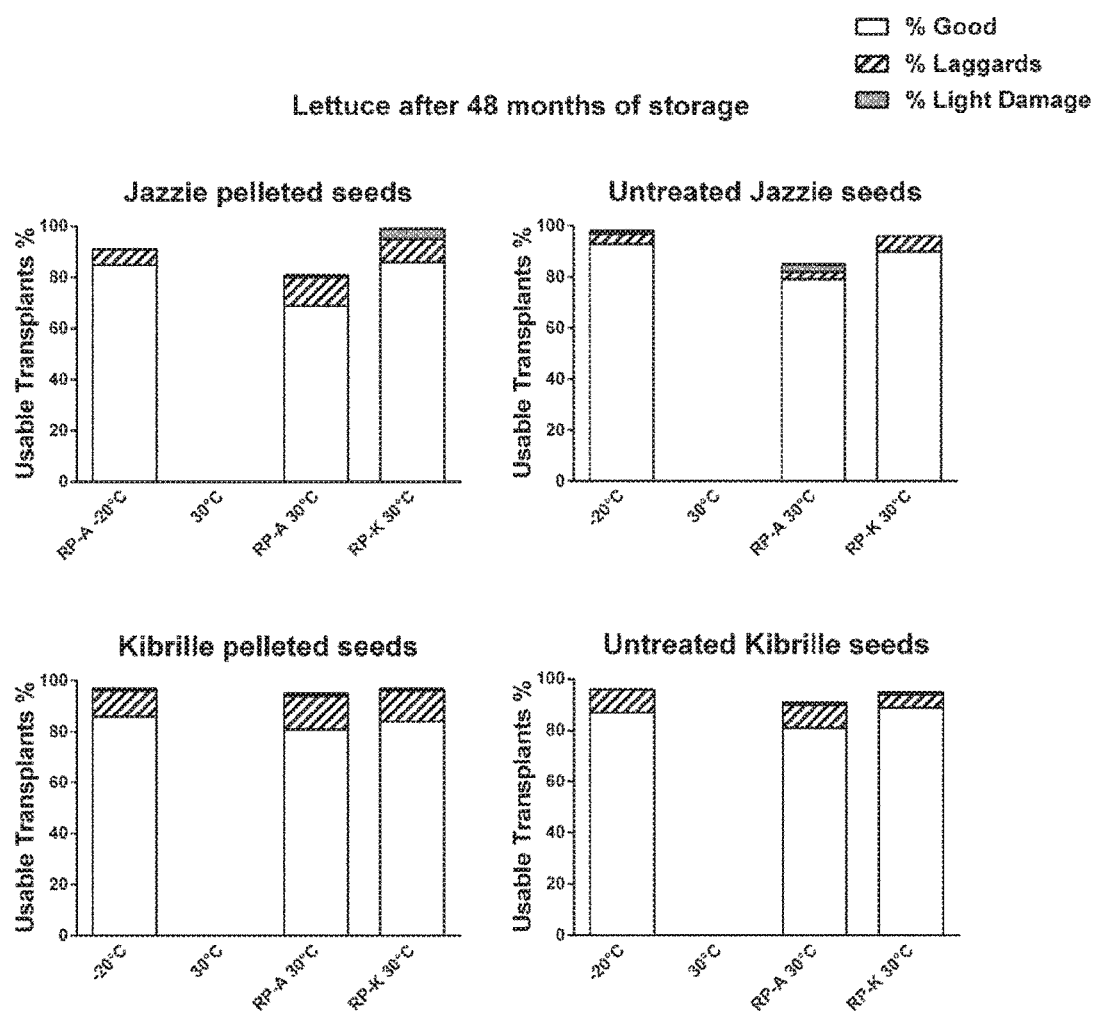

FIG. 5: Percentages of usable transplants (sub-classified as "good" seedlings, mild "laggards" and plantlets with "light damage") resulting from batches of untreated seeds and primed and pelleted seeds (pills) of the lettuce cultivars "Jazzie" and "Kibrille", were determined after storage for 48 months at −20° C. and 30° C., with and without RP-A® or RP-K®. Both RP-A® and RP-K® offer a similar level of protection to "Kibrille" seeds and pills at 30° C. as the freezer does at −20° C., whereas for "Jazzie" RP-K® gives an even better result at 30° C. than RP-A® and freezing at −20° C.

Figure 6:
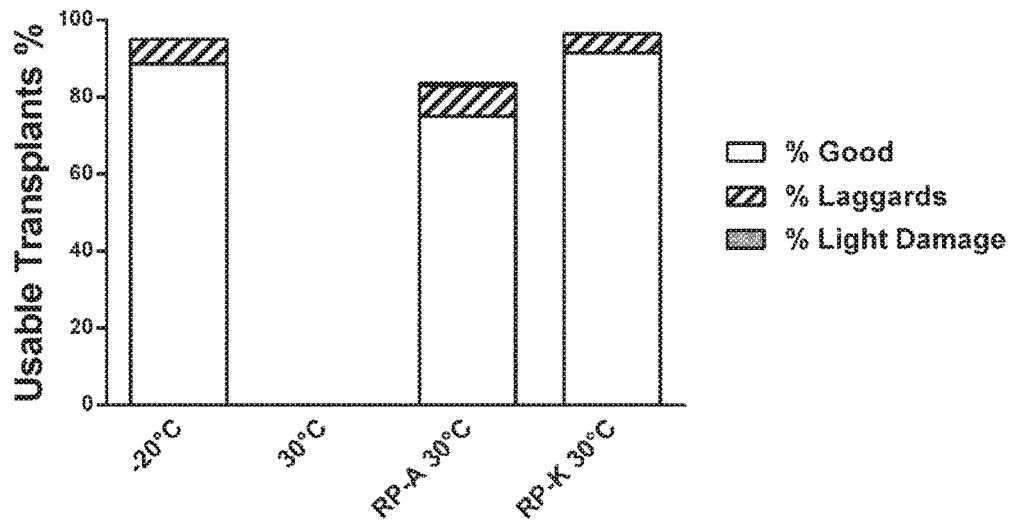

FIG. 6: Percentages of usable transplants (sub-classified as "good" seedlings, mild "laggards" and plantlets with "light damage") resulting from primed and pelleted seeds (pills) of celery that had been stored for 6 months at −20° C. (in the freezer) or at 30° C., in the presence or absence of RP-A® or RP-K®. Storage of celery pelleted seeds in the absence of an oxygen absorber was very detrimental, as it completely abolished the celery seeds' capacity to germinate and give rise to good-quality plantlets. In the presence of an oxygen absorber the percentage of usable transplants obtained from the stored pelleted seeds was much higher, with RP-K® giving the best result at 30° C. (equally good as after storage at −20° C. for the same period of time).

Figure 7:
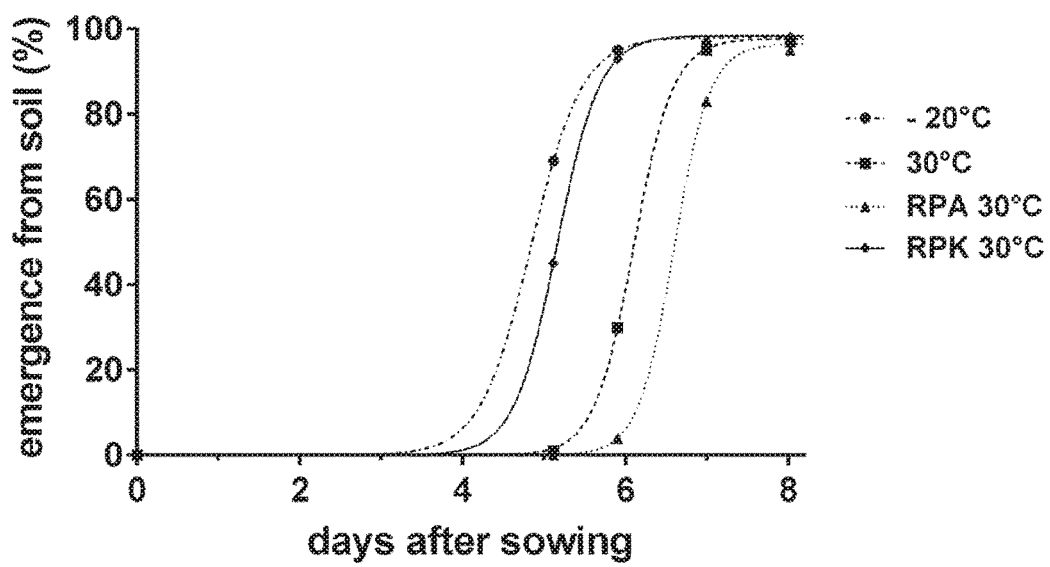

FIG. 7: Germination speed of bell pepper seeds, after storage at different temperatures in the presence or absence of oxygen absorbers, for a period of 18 months. Bell pepper seeds stored at 30° C. in the absence of an oxygen absorber had a lower quality (as shown by their delayed emergence from the soil: on average about two days later than seeds stored at −20° C. for the same period of time), even though they retained a high germination rate. Inclusion of RP-K® enhanced their quality significantly, as measured by the number of days it took for seedlings to emerge from the soil, after the seeds had been brought into favourable conditions for germination. The quality of seeds stored at 30° C. in the presence of RP-K® was very comparable to that of seeds stored in the freezer at −20° C. for the same period of time. In contrast, the use of RP-A® actually had a negative effect on storability of bell pepper seeds at 30° C., suggesting that primed bell pepper seeds are drought sensitive.

Figure 8A:
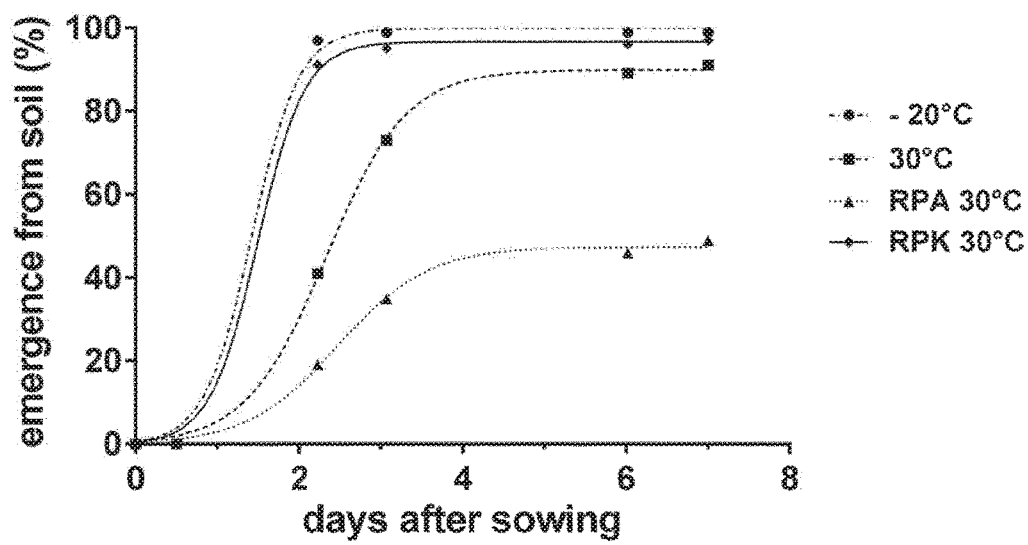

FIG. 8a: Germination speed of primed and pelleted seeds (pills) from endive, after storage at different temperatures in the presence or absence of oxygen absorbers, for a period of 18 months. Endive pelleted seeds stored well in the freezer, but storage at 30° C. negatively affected their quality, as measured by the number of days it took for seedlings to emerge from the soil, after the pelleted seeds had been brought into favourable conditions for germination. The quality of the seeds stored at 30° C. was clearly better in the presence of RP-K®. In contrast, the use of RP-A® actually had a very negative effect on the storability of endive seeds at 30° C., suggesting that primed endive seeds are drought sensitive.

Figure 8B:
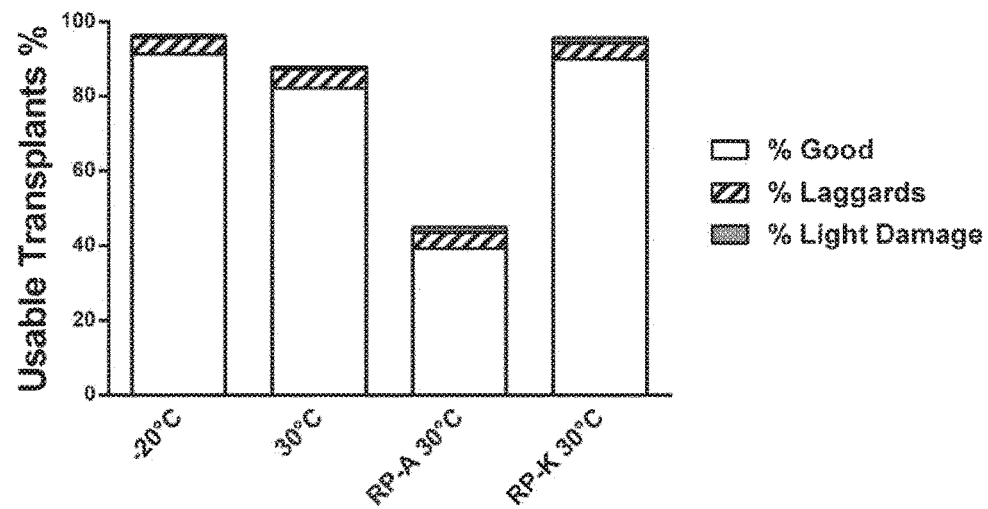

FIG. 8b: Quality assessment of the endive experiment from FIG. 8a, at the end of the experiment. Especially the negative effect of the use of RP-A® is visible in this graph. The graph shows percentages of usable transplants (sub-classified as "good" seedlings, mild "laggards" and plantlets with "light damage") resulting from primed and pelleted seeds (pills) of endive that had been stored for 18 months at −20° C. (in the freezer) or at 30° C., in the presence or absence of RP-A® or RP-K®.

Figure 9A:
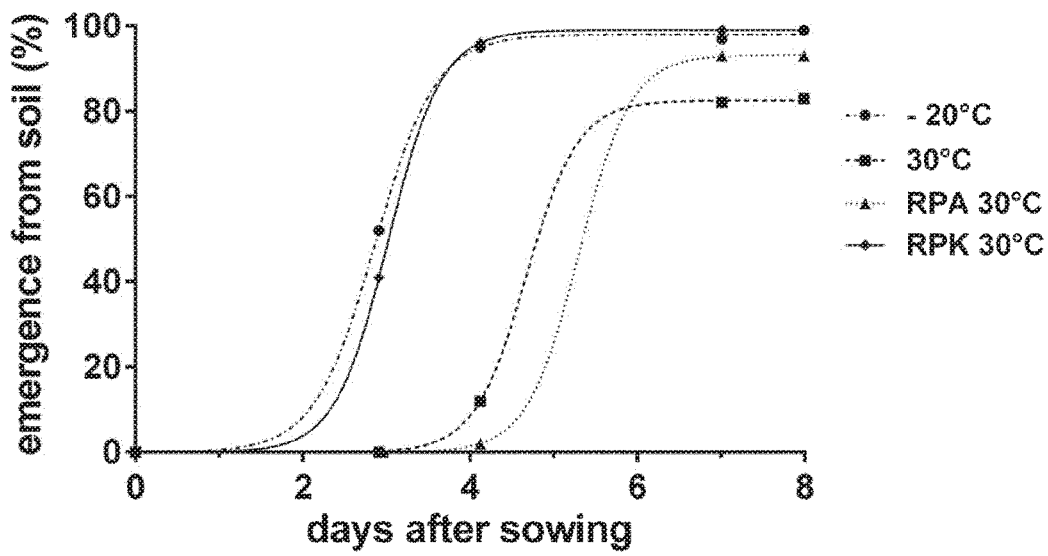

FIG. 9a: Germination speed of broccoli seeds, after storage at different temperatures in the presence or absence of oxygen absorbers, for a period of 18 months. Broccoli seeds stored well in the freezer, but storage at 30° C. negatively affected their quality, as measured by the number of days it took for seedlings to emerge from the soil and by the percentage of viable seeds (that gave rise to emerging seedlings), after the seeds had been brought into favourable conditions for germination. The quality of seeds stored at 30° C. improved greatly in the presence of RP-K®, reaching a quality that was entirely comparable to that of seeds stored at −20° C. for the same period of time. In contrast, the use of RP-A® did not have a positive effect on storability of broccoli seeds at 30° C.

Figure 9B:
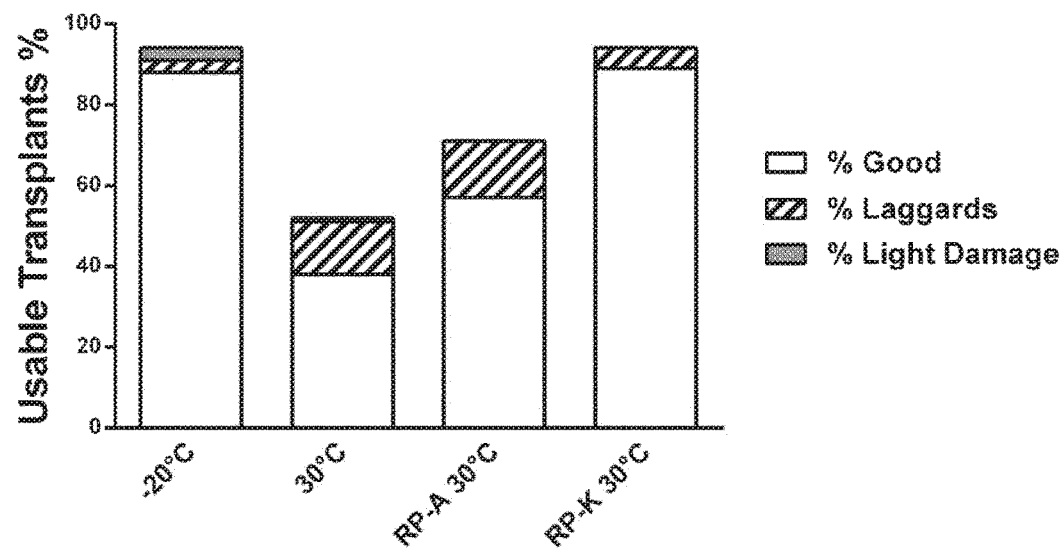

FIG. 9b: Quality assessment of the broccoli experiment from FIG. 9a, at the end of the experiment. This graph illustrates the pronounced negative effect of storage of broccoli seeds at 30° C., and the protective effect of oxygen absorbers (especially of RP-K®) on their storability in warm conditions for a period of 18 months. The graph shows percentages of usable transplants (sub-classified as "good" seedlings, mild "laggards" and plantlets with "light damage") resulting from broccoli seeds that had been stored for 18 months at −20° C. (in the freezer) or at 30° C., in the presence or absence of RP-A® or RP-K®.

Figure 10A:
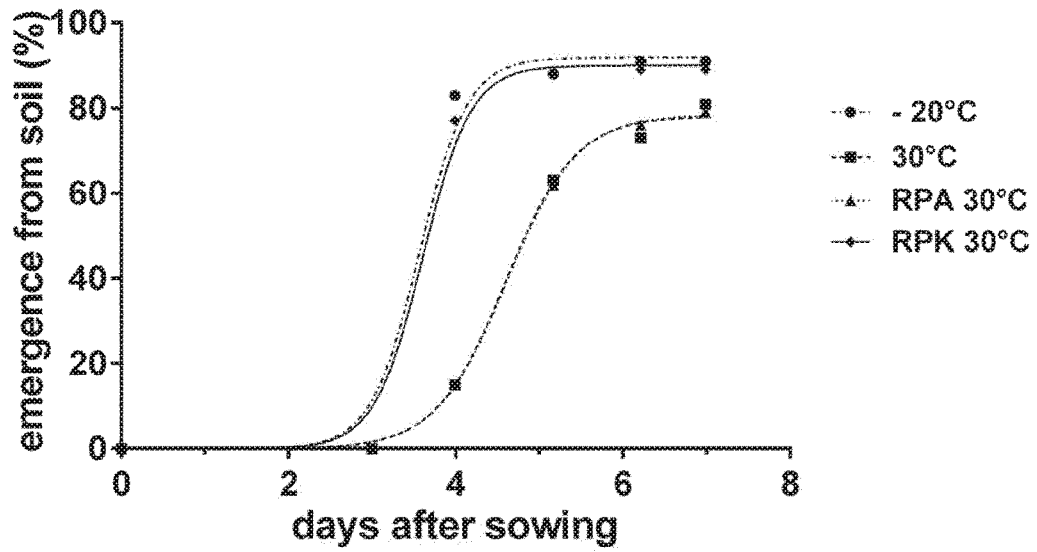

FIG. 10a: Germination speed of tomato seeds, after storage at different temperatures in the presence or absence of oxygen absorbers, for a period of 18 months. Tomato seeds were negatively affected by storage at 30° C., as measured by the number of days it took for seedlings to emerge from the soil, by the lack of synchrony in their germination, and by the total percentage of viable seeds (that gave rise to emerging seedlings), after the seeds had been brought into favourable conditions for germination. The inclusion of RP-A® did not have any obvious effect on the storability of tomato seeds at 30° C., but the inclusion of an RP-K® oxygen absorber during storage strongly protected the seeds at that temperature, which then performed equally well as seeds stored in the freezer for the same amount of time.

Figure 10B:
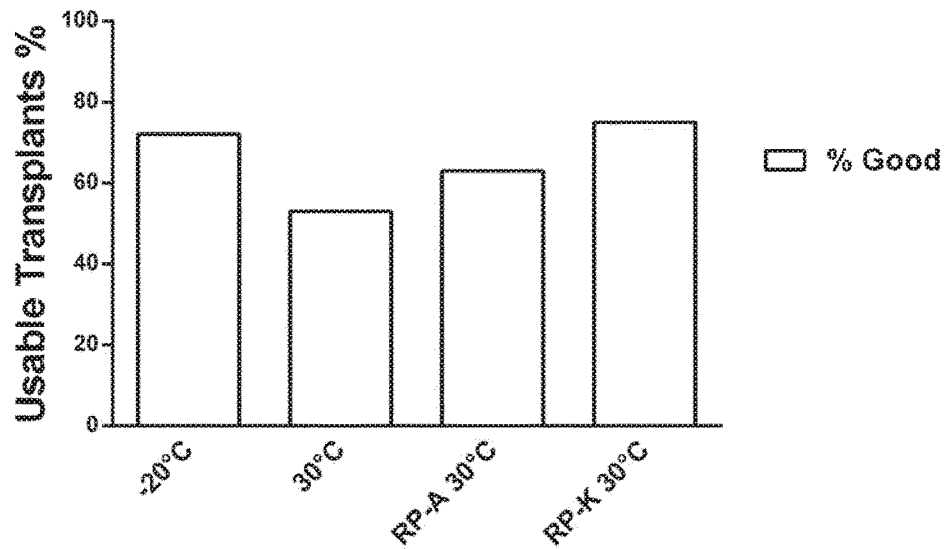

FIG. 10b: Quality assessment of the tomato experiment from FIG. 10a, at the end of the experiment. This graph reveals that RP-A® slightly increased the seed quality after storage at 30° C., but that the effect of RP-K® was much better. The quality of the seed batch stored at 30° C. in the presence of RP-K® was entirely comparable to that of the seed batch stored in the freezer at −20° C. for the same period of time.

Figure 11:
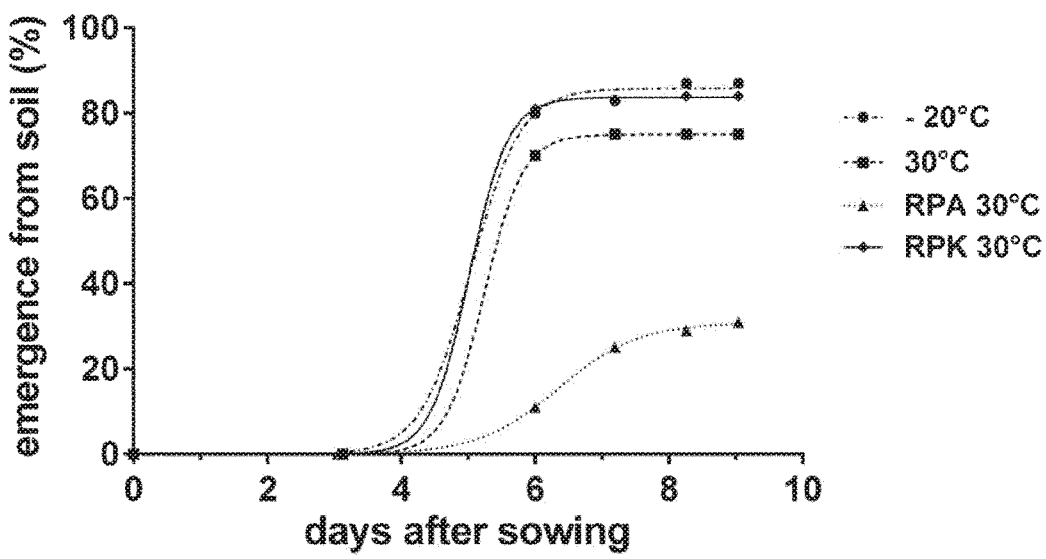

FIG. 11: Germination speed of beetroot seeds, after storage at different temperatures in the presence or absence of oxygen absorbers, for a period of 18 months. Storage at 30° C. negatively affected the quality of beetroot seeds, as measured by the number of days it took for seedlings to emerge from the soil (a delay of about one day, compared to seeds stored in the freezer), and by the total percentage of viable seeds (that gave rise to emerging seedlings), after the seeds had been brought into favourable conditions for germination. Inclusion of RP-K® prior to storage at 30° C. had a protective effect on the quality of beetroot seeds, resulting in a quality that was entirely comparable to that of a beetroot seed batch stored in the freezer for the same period of time. In contrast, the inclusion of RP-A® prior to storage at 30° C. had a very negative effect on the quality of beetroot seeds, suggesting that beetroot seeds are very drought sensitive.

Figure 12:
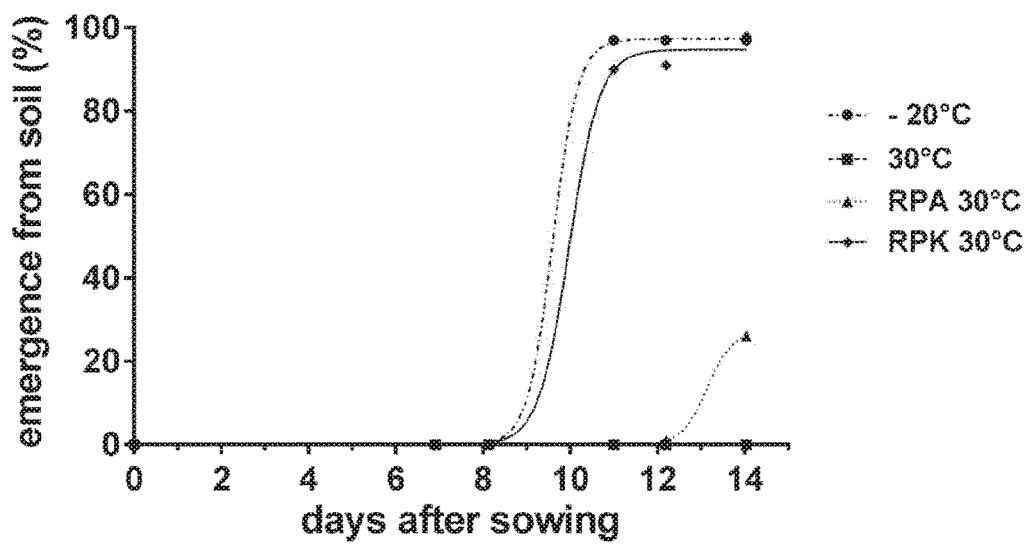

FIG. 12: Germination speed of primed and pelleted seeds (pills) from celeriac, after storage at different temperatures in the presence or absence of oxygen absorbers, for a period of 18 months. Storage at 30° C. for this period of time completely destroyed celeriac pelleted seeds, as shown by the complete lack of emerging seedlings, after the pelleted seeds had been brought into favourable conditions for germination. The inclusion of RP-K® prior to storage at 30° C. almost completely protected the quality of the stored celeriac pelleted seeds, as shown by the good performance of those pelleted seeds in the germination assay after 18 months of storage at 30° C. This seed batch performed more or less equally well as a batch of celeriac pelleted seeds that had been stored in the freezer for the same period of time. Inclusion of RP-A®, on the other hand, had no such protective effect. Only very few seedlings could be obtained from that batch, and those few seedlings emerged from the soil with many days delay.

DETAILED DESCRIPTION OF THE INVENTION

Preferably, the seeds are stored in a closed container (preferably airtight), such that the air surrounding the stored seeds may be entirely or essentially depleted of oxygen, without being replenished with fresh air from outside the container.

Preferably, "increased storability" or "improved storability" is intended to mean that the stored plant seeds on average retain viability for a longer period of time, when compared to identical seeds that are stored under identical conditions but in the absence of oxygen absorbers. Preferably, "viability" of a plant seed is to be understood in commercially relevant terms: a seed of a plant is considered "viable" when it has retained the ability to germinate—which is apparent after the seeds has been brought into favourable environmental conditions for germination—and the inherent ability to give rise to a healthy plant that is able to complete its life cycle at least up to the stage in which it produces the plant parts that are commercially relevant for the crop species to which it belongs. Depending on the crop species these plant parts may be leaves (e.g. for spinach, lettuce), roots (e.g. for carrot, parsnip, beetroot, radish), flower heads (e.g. for artichoke, broccoli, cauliflower), flowers, stems (e.g. for celery), hypocotyls (e.g. for celeriac), seeds (e.g. for cereals, maize, sunflower, rapeseed, soybean), fruits (e.g. for tomato, pepper, melon), etcetera, or any combination of the above-mentioned plant parts. The "ability to germinate" preferably implies that both the average germination rate and the resulting percentage of usable transplants of a batch of seeds is above the commercially accepted threshold for a commercial batch for that given plant species. This threshold is different when considering different plant species, but it is usually very high (e.g. 90 or 95%).

The present invention thus relates to a method for improving the storability of living seeds, which may comprise storing the seeds in the presence of an oxygen absorber, wherein said seeds on average retain viability for a longer period of time, when compared to identical seeds that are stored under identical conditions but in the absence of oxygen absorbers. This is intended to mean that the living seeds have retained the ability to germinate and the inherent ability to give rise to a healthy plant that is able to complete its life cycle at least up to the stage in which it produces the plant parts that are commercially relevant for the crop species to which it belongs. In addition to retained viability the seeds have also retained their vitality in terms of germination speed, germination uniformity and the ability to grow into commercially usable transplants.

In one embodiment the method of the invention uses oxygen absorbers that do not remove moisture from the environment of the stored seeds inside the container. Examples of such oxygen absorbers are e.g. RP-K®, Wonderkeep-RP®, KEEPIT YC™, KEEPIT L™. In this embodiment the moisture content or relative humidity inside the container remains unchanged while the oxygen level decreases, and this is particularly suited for seeds that are sensitive to (extreme) drying. This is often the case for seeds that were subjected to wet seed treatments, such as priming and pelleting of specific plant species or varieties. For example celeriac pills are very sensitive to drying, but their storability benefits enormously from oxygen depletion (see FIG. 12).

In another embodiment the method of the invention uses oxygen absorbers that do remove moisture from the environment of the stored seeds inside the container. Examples of such oxygen absorbers are e.g. RP-A®, Wonderkeep-X™, PharmaKeep®, AGELESS®, StabilOx™, KEEPIT KW™. In this embodiment the moisture content or relative humidity inside the container decreases along with the oxygen level, and this is suited for seeds that are less sensitive or insensitive to extreme drying.

This invention further relates to a method for increasing the storability of living seeds, which may comprise storing the seeds in the presence of an oxygen absorber, wherein the seeds are stored at a temperature between freezer temperature and the temperature at which the seeds lose their viability, in particular at fridge temperature, more in particular at ambient temperature, more in particular above ambient temperature. The upper temperature limit is the temperature at which the seeds lose their viability, because at this temperature the seeds will lose their capacity to germinate due to heat-damage, which cannot be rescued with oxygen absorbers. This temperature is species-dependent, as some plant species have seeds that are tolerant to higher temperatures than the seeds of other species. Arbitrarily, however, we here define an upper temperature of about 60° C. as the upper temperature limit for the successful application of this method. The invention is however not limited to being performed at this temperature or lower but can also be applied to seeds with a higher temperature tolerance.

This invention further relates to a method for increasing the storability of living seeds, which may comprise storing the seeds in the presence of an oxygen absorber, wherein the seeds are stored at a temperature of between about −20° C. and about 60° C., in particular between about 4° C. and about 40° C., more in particular between about 15° C. and about 35° C., more in particular between about 20° C. and about 30° C., more in particular at about 25° C.

Preferably, "storage temperature" is intended to mean the temperature of the atmosphere surrounding the stored seeds, i.e. the temperature inside the storage container/package, which is often correlated with the temperature outside the container/package.

In one embodiment, the method of the invention is performed prior to commercial packaging of the seeds. This may comprise e.g. the storage of commercial seeds in a seed-producing company before they are packed for commercial sales, and the storage of seeds used in pre-breeding or breeding activities.

In another embodiment the method of the invention is performed during the period between commercial packaging and sowing of the seeds. This may comprise e.g. the stages of storage of the packaged commercial seeds in a seed-producing company, transport of the packaged commercial seeds to retailers, distributors or shops, and the storage of the packaged commercial seeds by retailers, distributors or shops prior to sowing of the seeds.

Of course, the invention can also be used during both periods.

The method of the invention may be performed on seeds selected from untreated seeds, primed seeds, pilled seeds, encrusted seeds and coated seeds. Preferably, "priming" of seeds is intended to mean a pre-treatment of a batch of seeds prior to commercial sale, that enhances the germination speed of the seeds, such that sowing of the batch of seeds will result in the synchronous and swift germination and subsequent growth of seedlings from the individual seeds of the seed batch. On average, a primed batch of seeds will germinate and grow more quickly and more synchronously than a non-primed batch of seeds, because the inhibitory effects of seed dormancy have been removed, and a primed seed batch is also more uniform, having a shorter average germination time than a non-primed seed batch. However, an inherent drawback of seed priming is that it may significantly shorten the storability of the seeds. According to the present invention, this negative effect can be overcome by the storage of the primed seeds in the presence of an oxygen absorber.

Preferably, "pilling" or "coating" of seeds is intended to mean a pre-treatment of a batch of seeds prior to commercial sale, that involves the covering of individual seeds in the seed batch with a coating, such that they get the shape of (usually round) pills. The coating material may comprise a wide variety of chemical compounds intended to increase the chances for the seed to germinate well and to develop into a healthy seedling (such as substances that enhance seed germination and seedling growth, pesticides, fungicides, nematocides, antibiotics, herbicides to which the seed itself is resistant, etc). Also, the rounded shape of seed pills makes them easier to handle, especially when seed sowing is done in a large-scale, high-throughput manner, such as with automated sowing machines. Whereas individual seeds are often not round and not identical in size, weight and shape, the seed pills are far more homogenous and consistent in their dimensions.

The present invention further relates to seed packaging which may comprise seeds and at least one oxygen absorber.

The present invention further relates to the use of oxygen absorbers for increasing the storability of living seeds. The invention relates in particular to the new use of the oxygen absorbers RP-A® or RP-K® for improving the storability of living seeds.

The invention will be further illustrated in the examples that follow and that are for illustration purposes only and not intended to limit the invention in any way. In the Examples reference is made to the following figures.

EXAMPLES

Example 1

Use of Oxygen Absorbers to Increase the Storability of Lettuce Seeds

In order to demonstrate the effect of oxygen absorbers on the storability of living plant seeds, a series of experiments was conducted in which lettuce seeds were stored in the presence or absence of an oxygen absorber. The seeds were stored at different temperatures, and two different lettuce varieties were tested: a variety that usually survives storage quite well (Jazzie), and a variety that cannot be stored very long without a loss of viability and germination capacity (Kibrille). In addition, both naked seeds and pilled, primed seeds were included in this experiment, to determine the effect of oxygen absorbers on both types of commercial seeds. Also, two types of oxygen absorber were tested: RP-A® and RP-K®.

In three experiments, seeds from Jazzie and Kibrille were stored at −20° C. (in a freezer), at 15° C. and at 30° C., to reflect various conditions in which seed lots might be stored. In each temperature two sets of samples were stored: control seed batches without oxygen absorber, and seed batches with an oxygen absorber included in the packaging.

Figure 1:
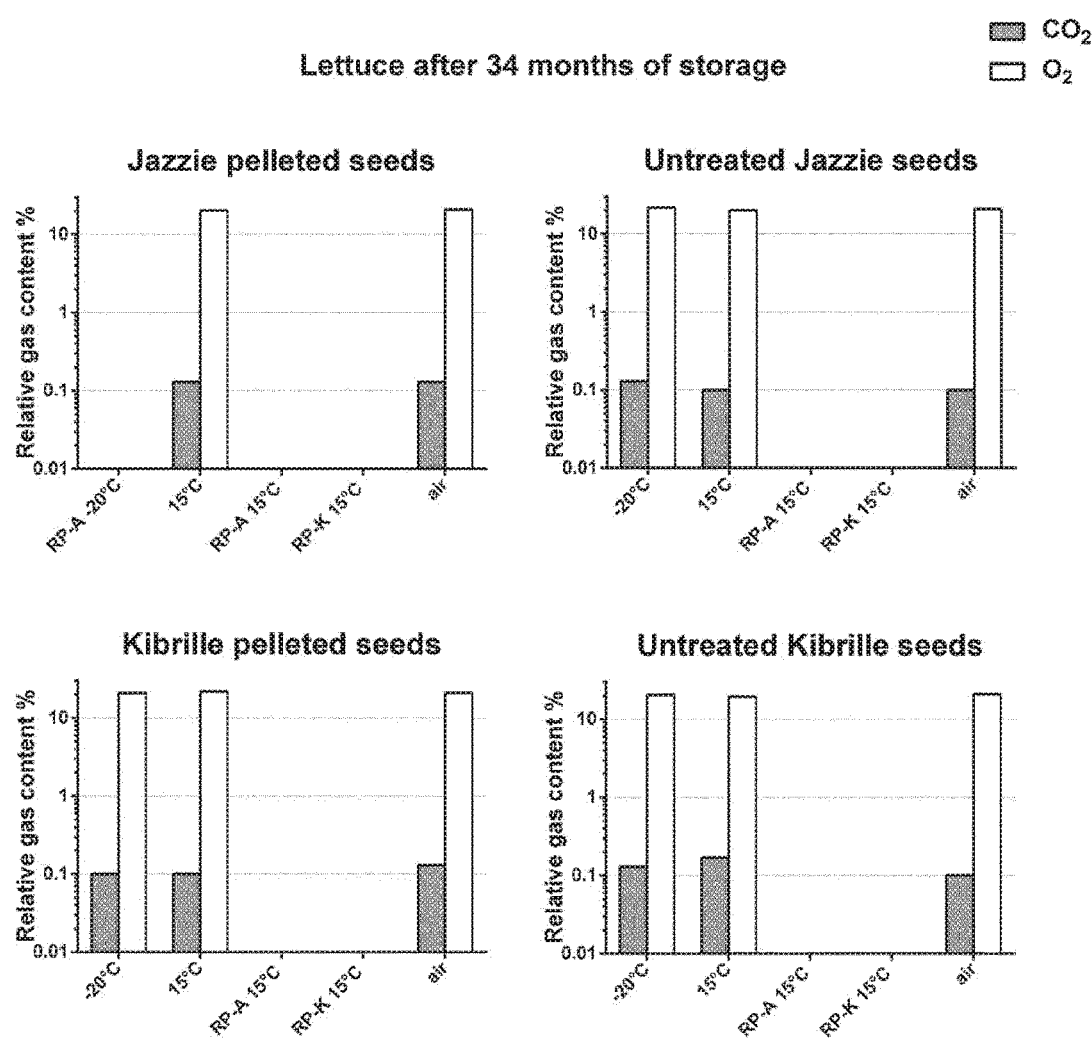
FIG. 1: Relative oxygen and carbon dioxide content of the sealed gas tight bags containing untreated seeds or primed and pelleted seeds (pills) of the lettuce cultivars "Jazzie" and "Kibrille" were measured after storage for 34 months at −20° C. and 15° C., with and without RP-A® or RP-K®, compared with the levels in air.

Oxygen measurements inside the seed packaging revealed that both the RP-A® and RP-K® oxygen absorbers are very efficient in oxygen-depleting the atmosphere within seed packaging, at −20° C., at 15° C. (FIG. 1) and at 30° C., suggesting that they operate well across a broad temperature range.

In a first experiment, seeds and pills of Kibrille and Jazzie were stored for 22 months (i.e. nearly 2 years) at −20° C., at 15° C. and at 30° C. After these 22 months of storage at −20° C. or 15° C., pilled Jazzie seeds showed a good to excellent percentage of usable transplants, and seed batches stored with RP-A® or RP-K® oxygen absorbers were at least as good. However, when stored for 22 months at 30° C. the pills completely lost their commercial value since not a single usable transplant was obtained (FIG. 2). Surprisingly, the inclusion of at least one RP-A® or RP-K® pack inside the packaging fully protected the seed pills even at 30° C., resulting in a percentage of usable transplants that was comparable to that of seed pills stored at −20° C. (FIG. 2) or 15° C.

The same observations were made for seed pills of Kibrille: especially at 30° C. the effect of RP-A® or RP-K® packs on seed pill storability was very pronounced (FIG. 2).

Very comparable results were obtained when the experimental set-up included naked, untreated lettuce seeds (FIG. 2).

In a second experiment, lettuce seeds were stored for 34 months (i.e. nearly 3 years). Again pilled and naked seeds from Jazzie and Kibrille were each stored at different temperatures (−20° C. and 15° C.), and the effect of RP-A® or RP-K® on seed storability was investigated. This experiment revealed that a prolonged storage at 15° C. was very detrimental for Kibrille seeds, but that the inclusion of a RP-A® or RP-K® pack in the seed packaging protected the seed pills: the Kibrille seeds retained a very high usable transplants percentage after 34 months of storage at 15° C. in the presence of an RP-A® or RP-K® pack (FIG. 3). The effect of RP-K® was in the case of Kibrille pills slightly less good than that of RP-A (FIG. 3).

In a third experiment, lettuce seeds were stored for 48 months (i.e. 4 years). Pilled and naked seeds from Jazzie and Kibrille were each stored at different temperatures (−20° C., 15° C. and 30° C.), and the effect of RP-A® or RP-K® on seed storability was investigated. This experiment (FIG. 4 and FIG. 5) revealed that storage for 48 months completely abolished the viability and capacity to germinate of Kibrille naked seeds and pills (both at 15° C. and at 30° C.), and that also Jazzie naked seeds and pills were very heavily affected by this prolonged storage (no transplants could be obtained after storage at 30° C., and only very few—generally of inferior quality—were obtained after storage at 15° C.). The inclusion of oxygen absorbers during storage protected the seeds, even over a period of 4 years: in the presence of an oxygen absorber, the percentage of seeds that gave rise to commercially valuable lettuce transplants was very comparable to that obtained after storage of the seeds at −20° C.

This was the case at both tested temperatures (15° C. and 30° C.). At 30° C., the protective effect of RP-K® was better for Jazzie than that of RP-A®.

Overall, the main difference between RP-A® and RP-K® is that the former not only reduced the oxygen concentration in a container, but also the moisture content, whereas the latter only depletes the atmosphere of oxygen, while leaving the moisture content unchanged. In the case of lettuce seeds, which are generally drought tolerant, there should thus not be a major difference between the effect of RP-A® and RP-K®. However, for the preservation of more drought-susceptible seeds (such as e.g. primed and/or pilled celeriac seeds, FIG. 12) the use of RP-K® is preferred, as this does not radically lower the moisture content inside the seed packaging.

Example 2

Use of Oxygen Absorbers to Increase the Storability of Celery Seeds

The effect of an oxygen absorber on the storability of pelleted seeds (pills) from celery (each pill containing a primed celery seed) was investigated. The celery pills were stored at −20° C. (in the freezer), at 30° C. in the absence of an oxygen absorber, and at 30° C. in the presence of RP-A® or RP-K®. The percentage of transplants obtained from the pills after transferring them to favourable conditions for germination was highly dependent on storage conditions: in the absence of an oxygen absorber, celery pills lose their viability within 6 months, whereas storage in the freezer results in more than 90% viable transplants. Storage at 30° C. in the presence of an oxygen absorber gives the same level of protection as storage in the freezer, and especially RP-K® protected celery pills very well against prolonged storage at this temperature (FIG. 6).

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

Example 3

Use of Oxygen Absorbers to Increase the Storability of Seeds from Other Vegetable Species The effect of oxygen absorbers on the storability of various other commercial vegetable seeds for a period of 18 months was investigated.

To show the effectiveness of adding RP-A® or RP-K® to living seeds, with the goal to preserve their vitality (in terms of germination speed, germination uniformity and commercially usable transplants) after storage in hermetic packaging, these treatments were compared to storage in a freezer at −20° C.

Although it is known that commercial seeds are best kept frozen, frozen delivery of seeds to the end user and storage by the end user is in practice challenging and expensive, or entirely impossible in many countries. Therefore we aim at the preservation of seed vitality at temperatures, elevated well above traditional optimal storage temperatures.

To show the possible added value of RP-A® and RP-K® to preserve seed-vitality at elevated temperatures, hermetically sealed seeds were stored at 30° C. with and without RP-A® or RP-K®.

Treatment 1 consisted of a hermetically heat-sealed, aluminum coated bag with seeds that were equilibrated for at least a week in a seed vault with a relative air humidity (RH) of 30% at 15° C. The seeds were heat-sealed under normal air, in an unchanged atmosphere. By storing these bags at 30° C., relatively fast deterioration of the vitality of seeds (especially of seeds treated with disinfection, priming, coating or pelleting) can be expected.

Treatment 2 consisted of a hermetically heat-sealed, aluminum coated bag with seeds that were equilibrated for at least a week in a seed vault with a relative air humidity (RH) of 30% at 15° C. The seeds were heat-sealed under normal air, in an unchanged atmosphere, but an RP-A® (RP-3A, suitable for 300 cc of air volume) was added to absorb both oxygen and moisture. These bags were also stored at 30° C.

Treatment 3 consisted of a hermetically heat-sealed, aluminum coated bag with seeds that were equilibrated for at least a week in a seed vault with a relative air humidity (RH) of 30% at 15° C. The seeds were heat-sealed under normal air, in an unchanged atmosphere, but an RP-K® (RP-3K, suitable for 300 cc of air volume) was added to absorb only oxygen, without affecting the moisture content of the package. These bags were also stored at 30° C.

Treatment 4 consisted of a hermetically heat-sealed, aluminum coated bag with seeds that were equilibrated for at least a week in a seed vault with a relative air humidity (RH) of 30% at 15° C. The seeds were heat-sealed under normal air, in an unchanged atmosphere. By storing these bags in a freezer at −20° C., the vitality of the seeds is expected to remain practically unchanged over the course of the experiment. A day before use, the seeds were thawed at 15° C. for at least 24 hours to avoid condensation of water on the seeds upon opening the bag.

Before opening the heat-sealed bags after a certain time of storage, gas samples were taken and analyzed using an OxyBaby (Witt-Gasetechnik, Witten, Germany) to measure oxygen and carbon dioxide levels inside the seed bags. All measurements were done in triplicate to reliably detect bags that were leaky from the start of the experiment, usually because of imperfect heat-sealing. Leaky bags were removed from the experiment.

To compare the effects of these treatments on seed-vitality, bags of the four treatments were sown next to each other at five time points (in this Example only the result after 18 months of storage is shown). Of each of the four treatments, 5 bags containing 150 seeds each were prepared, to be able to compare seed vitality at five time points.

Seed vitality and commercial usability of the resulting plantlets was checked by sowing the seeds on peat soil in a greenhouse at the optimal temperature, lighting and watering regime for each crop, as comparable as possible to how the end-user of the seeds would sow the commercial seeds to obtain an optimal germination and plantlet quality. Parameters that were measured to estimate seed vitality included emergence from the soil at regular intervals during the germination of the seeds, ultimately leading to the final germination percentage relative to the number of seeds that was sown when no additional seedlings emerged. Typically, emergence through time can be depicted in a graph showing differences in germination speed, uniformity and final germination.

Parameters that were measured to estimate plantlet quality included the percentage of good seedlings, laggards and lightly damaged plantlets that are still acceptable to the average plant grower, taken together as the commercially usable transplant percentage. Plantlets that were lagging behind too much, that were severely damaged, or seeds that did not germinate at all, were not included in the usable transplant percentage. These measurements were done according to the International Seed Testing Association (ISTA) regulations.

For all vegetable seed batches examined in this experiment the protective effect of RP-K® was much better than that of RP-A®, and the latter often had a pronounced negative effect on seed storability at 30° C., suggesting that seeds from the tested plant species were more sensitive to excessive drying than the lettuce seeds of Example 1 were.

The results are shown in FIG. 7 (for bell pepper), FIG. 8 (for endive), FIG. 9 (for broccoli), FIG. 10 (for tomato), FIG. 11 (for beetroot), and FIG. 12 (for celeriac). More information about these experiments and the interpretation thereof can be found in the corresponding figure legends.

The invention is further described by the following numbered paragraphs:

1. Method for improving the storability of seeds, comprising storing the seeds in the presence of an oxygen absorber.
2. Method of paragraph 1, wherein the seeds are stored in a closed container.
3. Method of paragraph 2, wherein the oxygen absorber does not remove moisture from inside the container.
4. Method of paragraph 2, wherein the oxygen absorber removes moisture from inside the container.
5. Method of any one of the paragraphs 1-4, wherein the seeds are stored at a temperature between freezer temperature and the temperature at which the seeds lose their viability.
6. Method of any one of the paragraphs 1-5, wherein the seeds are stored at fridge temperature, in particular at ambient temperature, more in particular above ambient temperature.
7. Method of paragraph 6, wherein the seeds are stored at a temperature of between about −20° C. and about 60° C., in particular at about 4° C. to about 40° C., more in particular at about 15° C. to about 35° C., even more in particular at about 20° C. to about 30° C., preferably at about 25° C.
8. Method of any one of the paragraphs 1-7, wherein the method is performed prior to commercial packaging of the seeds.
9. Method of any one of the paragraphs 1-8, wherein the method is performed during the period between commercial packaging and sowing of the seeds.
10. Method of any one of the paragraphs 1-8, wherein the method is performed on seeds selected from untreated seeds, primed seeds, pilled seeds, encrusted seeds and coated seeds.
11. Seed packaging comprising seeds and an oxygen absorber.
12. Use of an oxygen absorber for improving the storability of seeds.
13. Use of paragraph 12, wherein the oxygen absorber does not absorb moisture.
14. Use of RP-A® or RP-K® oxygen absorbers for improving the storability of seeds.

* * *

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method for storing seeds that are at least one of untreated living seeds, primed living seeds and pilled living seeds, the method comprising storing the seeds in the presence of an oxygen absorber
   in a closed container for a period of at least 6 months
   at a temperature between 25° C. and 40° C.;
   thereby improving the storability and long-term viability of the seeds as compared to the seeds not stored in the presence of an oxygen absorber.
2. The method as claimed in claim 1, wherein the oxygen absorber does not remove moisture from inside the container.
3. The method as claimed in claim 1, wherein the oxygen absorber removes moisture from inside the container.
4. The method as claimed in claim 1, wherein the seeds are stored at about 30° C.
5. The method as claimed in claim 1, wherein the method is performed prior to commercial packaging of the seeds.
6. The method as claimed in claim 1, wherein the method is performed during the period between commercial packaging and sowing of the seeds.
7. The method of claim 1, wherein the oxygen absorber is a RP-A® or RP-K® oxygen absorber.